Nov. 8, 1966   R. B. FISHER   3,284,789
CATHODIC PROTECTION SYSTEM DETECTOR
Filed March 19, 1963   3 Sheets-Sheet 1
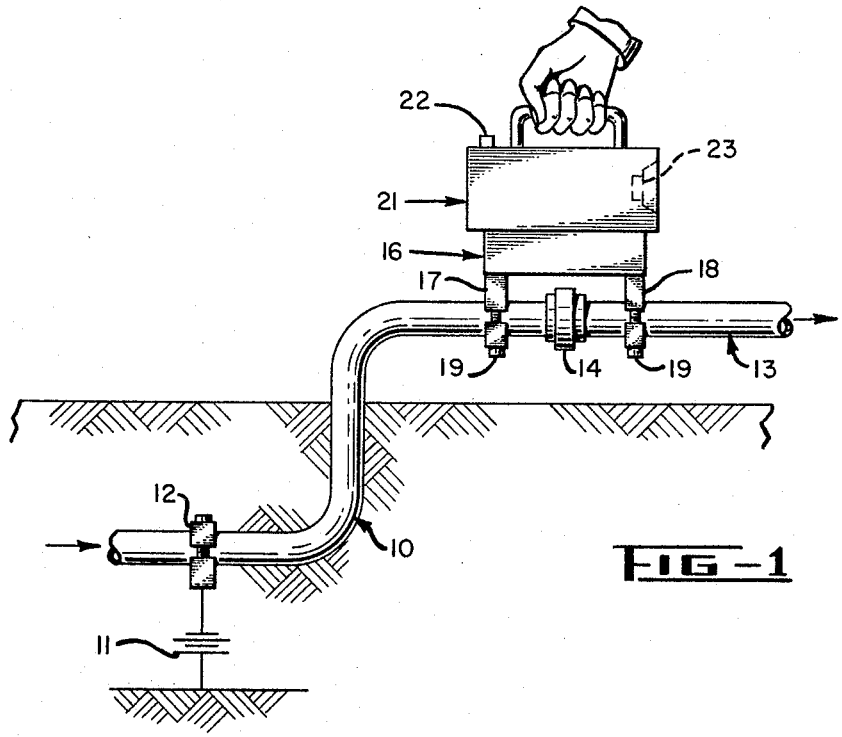
FIG-1
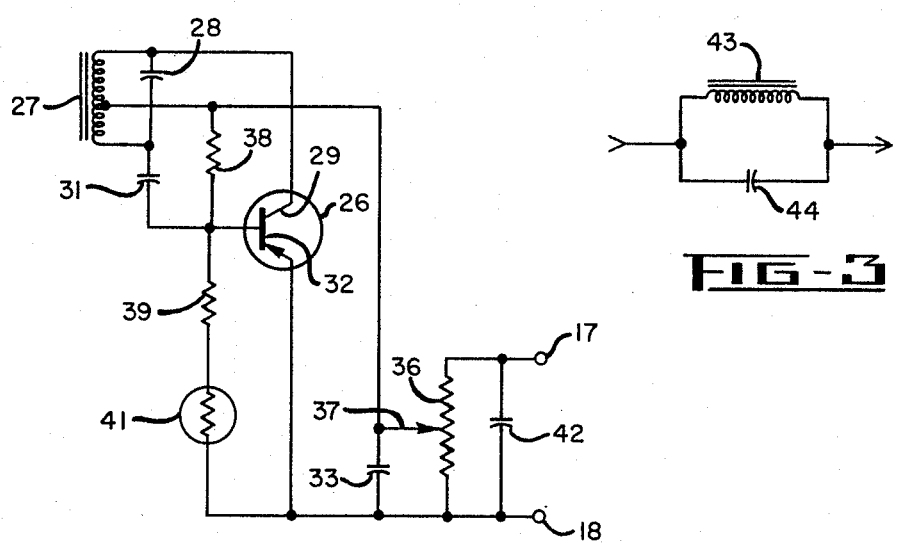
FIG-2
FIG-3
INVENTOR.
ROBERT B. FISHER
BY
*Edward B. Hogg*
ATTORNEY Nov. 8, 1966  R. B. FISHER  3,284,789
CATHODIC PROTECTION SYSTEM DETECTOR
Filed March 19, 1963  3 Sheets-Sheet 3

INVENTOR.
ROBERT B. FISHER
BY
ATTORNEY

United States Patent Office 3,284,789
Patented Nov. 8, 1966

3,284,789
CATHODIC PROTECTION SYSTEM DETECTOR
Robert B. Fisher, El Monte, Calif., assignor to Tinker and Rasor, San Gabriel, Calif., a corporation of California
Filed Mar. 19, 1963, Ser. No. 266,301
13 Claims. (Cl. 340—249)

This invention relates to a testing method and means and more particularly to a method and apparatus for determining the proper operation of cathodic protection systems on pipelines, cables and the like.

Metallic objects such as pipe, cable and the like which are buried in the earth are subject to disassociation. That is, a chemical reaction takes place wherein positively charged ions are formed together with electrons. Different metals have this property in different degrees; those which lose electrons most readily having it to the greatest degree. If other metals of different reactivity are present adjacent the buried object, the electrons which one loses may be picked up by the other, and which ever object comprises the anode corrodes while the other object which comprises the cathode is protected. To prevent the buried object from comprising an anode, it is common practice to apply a negative potential to the buried object. Such protection for a buried metal object is commonly known as cathodic protection.

The maintenance of such a cathodic protection system includes monitoring certain check points within the system for proper voltage level between the protected object and the earth a spaced distance therefrom. Commonly, the protected system, such as a buried gas pipeline, is connected to the line into a house or industrial establishment by means of an insulated coupling. With present testing systems, a trained technician or engineer is required to take measurements of the potential between the buried object with respect to the ground or adjacent insulated system. The equipment used to measure such potential includes a sensitive voltmeter, and such measurements are generally taken anywhere from about once every three months to once a year. Experience has shown, however, that many problems can be caused by such infrequent testing since the system may be without cathodic protection for extended periods of time between testing intervals.

An object of this invention is the provision of an improved cathodic protection system detecting method and apparatus which permits periodic testing by untrained personnel.

An object of this invention is the provision of a cathodic protection system detector which includes an oscillator attached to the system under test and which is energized by the cathodic protection potential, the output from the oscillator being detected by any suitable detector means.

These and other objects and advantages of the invention are obtained by means of a system comprising an oscillator fixedly secured to the cathodic protection system, which oscillator is energized by the D.C. cathodic protection potential existing at the measurement point. If such a potential does not exist, or is below a predetermined value, the oscillator fails to function. If, on the other hand, the cathodic protection potential is above a predetermined value, the oscillator is energized by such potential to thereby produce an electromagnetic signal. The signal generated by oscillator is detected and amplified by a suitable receiver to a point where an audible or visual indication of the receiver output may be obtained. Where necessary, a suitable A.C. filter may be included in the connection between the cathodic protection system and the oscillator to decouple the oscillator from any A.C. signals which may be present in the system to thereby prevent spurious or false oscillations.

These and other objects and advantages of the invention will become apparent from the following detailed description when read in conjunction with the accompanying drawings. In the drawings, wherein like reference characters refer to the same parts in the several views:

FIGURE 1 shows one embodiment of the detector system of this invention applied to a pipeline provided with cathodic protection;

FIGURE 2 is a schematic circuit diagram of an oscillator circuit which may be used in the embodiment of the invention shown in FIGURE 1;

FIGURE 3 is a schematic circuit diagram of a filter which may be employed in conjunction with the oscillator of FIGURE 2;

Figure 4:
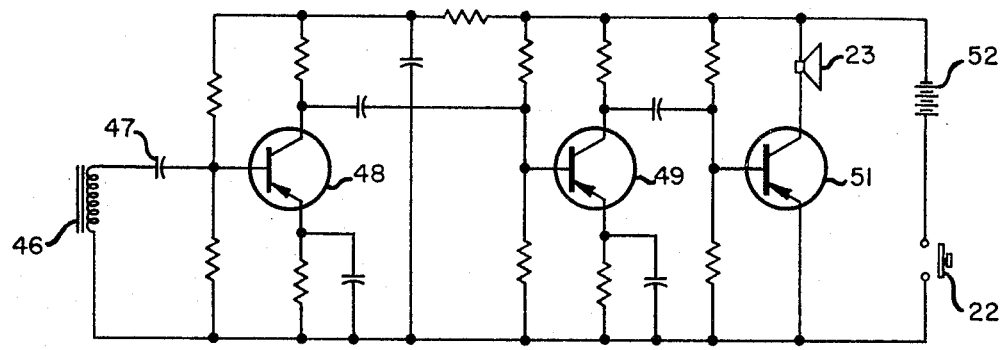
Figure 5:
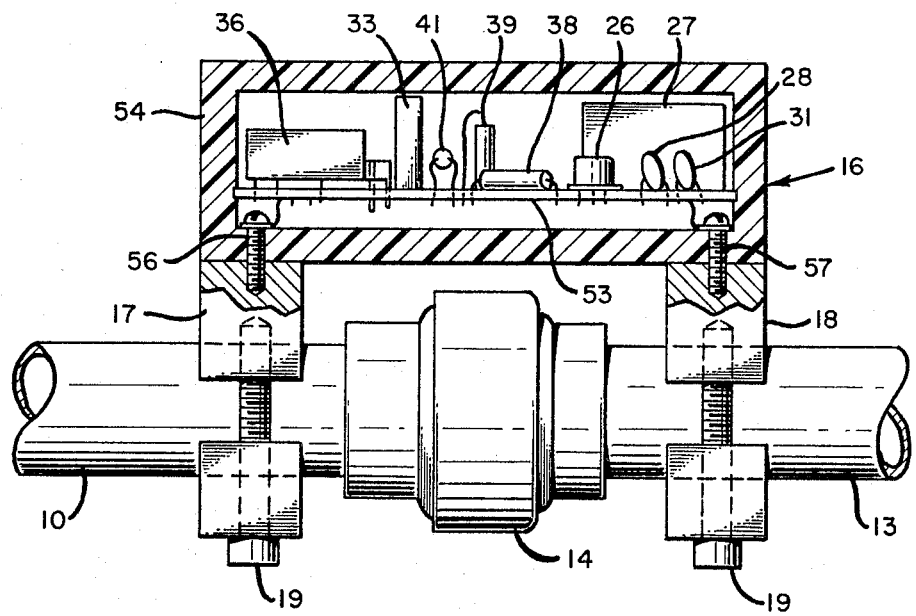
Figure 6:
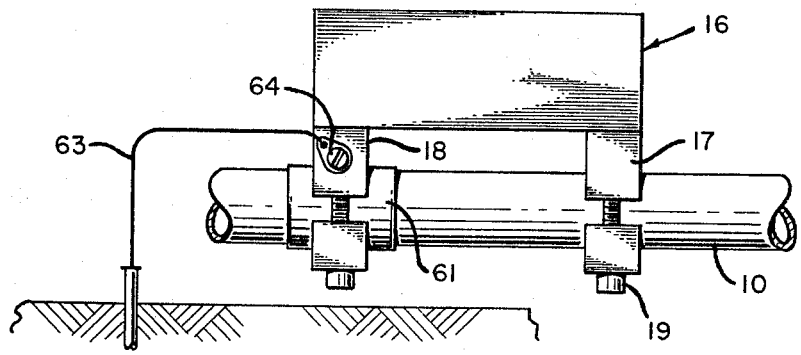
Figure 7:
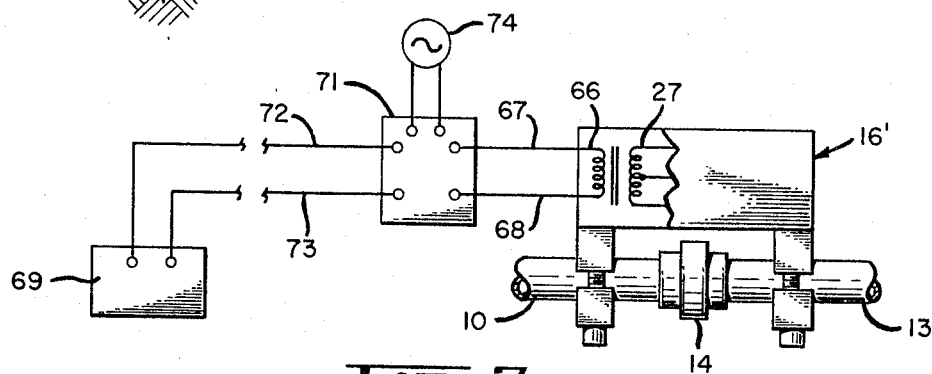
Figure 8:
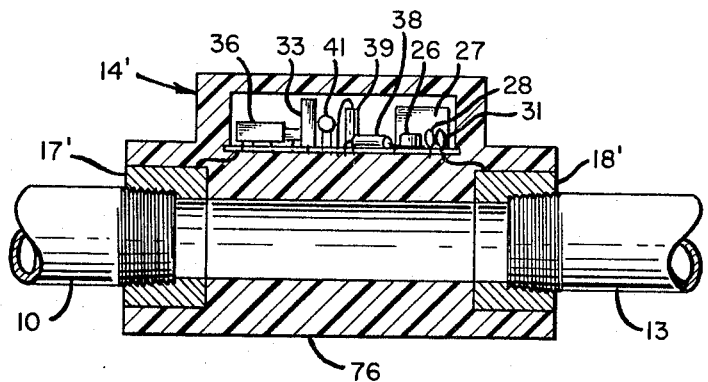

FIGURE 4 of the drawings is a schematic circuit diagram of a detector or receiver which may be employed in the detecting system of this invention;

FIGURE 5 is a cross sectional view of the oscillator shown in FIGURE 1;

FIGURE 6 is an elevational view of the oscillator applied in a different manner to a pipeline system subject to cathodic protection;

FIGURE 7 of the drawings shows a modified form of monitoring system in which the signal from the oscillator is connected to a recording or indicating instrument at a remote location; and FIGURE 8 is a modified form of oscillator in which the oscillator comprises an integral part of an insulated pipe coupling.

Reference is first made to FIGURE 1 of the drawings where the cathodic protection system detector of this invention is shown applied to a pipeline system which includes a pipe 10 which may be used to transmit gas from a suitable gas supply source not shown. The pipe 10 is shown buried in the earth and is provided with cathodic protection. In the drawing, a forced cathodic protection arrangement is shown which includes a D.C. source of supply 11 comprising a battery having the anode thereof connected to the earth while the cathode is connected to the pipeline 10 by a clamping type terminal 12. The pipe 10 is thereby made negative with respect to the surrounding earth and therefore acts as a cathode, from whence the term cathodic protection is obtained. In practice a magnesium anode is often provided in the pipeline system within the pipe for the establishment of the required D.C. potential on the pipeline.. It will be understood that the detector system of this invention may be used with any cathodic protection system, and is not limited to use on systems employing any particular cathodic potential source.

In FIGURE 1, a pipe 13 is shown connected to the pipe 10 through a coupling member 14; the pipe 13 leading into a home, industrial building, or the like. Often the pipes 10 and 13 are made of steel or other metal. In order to isolate the piping within the home or building from the cathodic protection potential, coupling 14 is made of an electrical insulating material. Such insulated coupling members are well known and are commonly used on pipeline systems employing cathodic protection. If the pipeline is used for the transmission of gas, for example, as suggested above, the outlet pipe 13 may feed various gas furnaces, appliances, and the like in the home or building. For this reason, an electrical path exists between the pipe 13 and earth, which path provides a return circuit for the detector of this invention when applied across the coupling 14 in a manner described in detail hereinbelow.

It will be understood, therefore, that with the cathodic protection potential applied to the pipe 10, a potential drop will exist across the coupling 14 between the pipe 10 and the pipe 13 which potential may approach the potential of the cathodic protection source 11; the potential drop across the insulated coupling depending upon the electrical conductivity of the path between the pipe 13 and the earth. In forced cathodic protection systems, a voltage in the range of between 0.2 and 48 volts may be used, whereas with a magnesium anode cathodic protection system a voltage of about 0.5 volts is normal when the pipe 10 is made of steel. The detector system of this invention is not limited to use on cathodic protection systems of any particular voltage.

In accordance with this invention an oscillator 16 is employed which is energized by a potential derived from the cathodic protection system. One terminal 17 of the oscillator 16 is shown connected to the pipe 10 while the other terminal 18 of the oscillator 16 is shown connected to the pipe 13, the terminals 17 and 18 being shown clamped to the pipes by means of screw fastening means 19. In use, the oscillator remains clamped onto the pipeline system, and if the cathodic potential on the pipeline 10 exceeds a predetermined value the oscillator will oscillate, the normal condition of the oscillator being the energized state. If, however, the cathodic potential fails, or drops below a predetermined level, the oscillator 16 will cease to function. In order to detect or determine whether or not the oscillator is operating, a detector unit comprising a receiver 21 is placed adjacent the oscillator 16. When the detector is energized upon actuation of a pushbutton switch 22 by the operator, the signal from the oscillator 16 is received and amplified and made to energise a loud speaker 23 or other suitable indicator not shown.

Reference is now made to FIGURE 2 of the drawings wherein there is shown a schematic circuit diagram of the oscillator which includes the terminals 17 and 18 for the supply of a cathodic protection potential thereto. It will be noted that no other source of supply is provided for the oscillator. The illustrated arrangement comprises a transistor Hartley oscillator which is series-fed and which includes a transistor 26 and a tank circuit comprising a shunt-connected tapped inductor 27 and capacitor 28. One end of the resonant tank circuit is shown connected to the collector electrode 29 of the transistor 26 while the other end thereof is connected through a D.C. blocking capacitor 31 to the base electrode 32 of the transistor. An A.C. bypass capacitor 33 connects the intermediate tap on the inductor 27 to the terminal 18 which terminal functions as the "ground" terminal in the illustrated arrangement. With the illustrated PNP type transistor 26, the terminal 17 is connected to the negative pipe 10.

A potentiometer 36 is connected across the terminals 17 and 18. Control of the operating point of the oscillator between operative and inoperative conditions, is obtained by setting of the transistor bias supply voltage by means of the potentiometer 36. The movable arm 37 of the potentiometer is connected to the collector electrode 29 through a portion of the winding 27, while the emitter electrode is directly connected to the terminal 18. The necessary base-emitter bias is obtained by a voltage dividing network comprising resistors 38 and 39 and a thermistor 41 connected between the movable arm 37 and the "ground" terminal 18, the junction between the resistors 38 and 39 being connected to the base electrode 32 of the transistor.

The oscillator circuit components, including the transistor 26, are preferably chosen for their ability to oscillate with a very small collector bias of say, .2 to .3 volt. By adjustment of the potentiometer 36, the oscillator may be made to switch between the operative and inoperative conditions with a cathodic protection potential across terminals 17 and 18 within a wide range of voltages; the lowest possible voltage being the .2 to .3 volt necessary for operation of the oscillator. No practical upper limit of cathode protection potential across the terminals 17 and 18 exists since the voltage to the oscillator may be reduced any desired amount by adjustment of the potentiometer 36.

Referring again to FIGURE 1, it will be understood that the potential drop across the insulated pipe coupling 14 may deviate from the cathodic protection potential on pipe 10 with respect to earth; such potential drop depending, among other factors, upon the resistance of the path from the pipe 13 to ground. Regardless of the potential drop across the insulated coupling 14, the potentiometer 36 is adjusted such that the oscillator ceases to operate at a selected minimum cathodic protection potential on the pipe 10. Such a minimum value may be reached when the potential on the pipe 10 drops to a value at which cathodic protection is impaired. In this manner the voltage dividing potentiometer 36 is used to relate the minimum desired cathodic protection potential on the pipe 10 with the operating point of the oscillator.

During operation of the oscillator, the tank circuit comprising the inductor 27 and capacitor 28 resonates at the desired output frequency, generally in the range of 400 to 800 cycles per second. It will be understood, however, that the invention is not limited to any particular oscillator frequency.

Occasionally, an A.C. signal may appear across the coupling 14 due to faulty grounding of electrical equipment in the vicinity. For example, if the pipeline illustrated in FIGURE 1 is used for the transmission of gas and connects to gas-fired water heater, the heater may be improperly grounded and an A.C. signal may be induced in the line from an associated solenoid operated valve. If the A.C. signal appears in objectionable amounts to interfere with the operation of the oscillator, it may be necessary to remove the signal by filtering. In FIGURE 2 there is shown a capacitor 42 in shunt with the terminals 17 and 18 for bypassing the undesired A.C. signals. If desired, a tank circuit such as shown in FIGURE 3 of the drawings, and comprising a shunt-connected inductor 43 and capacitor 44 tuned to the interference frequency may be included in the input circuit to the oscillator in the line between the terminal 18 and the lower end of the potentiometer 36. Such a filter acts as a high impedance to the interfering A.C. frequency. In many cases neither filter circuit is required. In other instances one or the other filter circuit will suffice. At some locations, a combination of both filter circuits may be required to filter out the undesired A.C. frequencies.

Oscillations of the oscillator 16 are detected by the portable receiver 21. The receiver 21 may be of any suitable type and is preferably of a small size easily carried by the operator and readily available to use. The receiver illustrated in FIGURE 4 of the drawings includes an inductor 46 which serves as an inductive pickup of the electromagnetic field produced by the oscillator 16. The received signal is coupled through a coupling capacitor 47 to the input of the first stage of a three-stage transistor amplifier. The three stages include the respective transistors 48, 49 and 51 each connected in a common emitter configuration. The illustrated transistor amplifier stages are of a well known design and will not be described in further detail except to state that the various associated components are selected to provide maximum amplification of the desired frequencies from oscillators such as the oscillator 16. A D.C. source of supply comprising a battery 52 provides the necessary transistor bias potentials, and the normally open pushbutton switch 22 is shown included in series with the supply source. The receiver is operated by simply pushing the switch 22 to a closed position, and when the receiver is held in close proximity the oscillator 16, a tone may be heard from the loudspeaker 23 included in the output electrode circuit of the output transistor 51. A tone heard from the loudspeaker indicates proper operation of the cathodic protection system. Conversely, lack of a tone indicates that the cathodic protection system potential is below the desired predetermined value.

Reference is now made to FIGURE 5 of the drawings wherein there is shown a longitudinal cross sectional view of the oscillator 16 attached across the insulated coupling 14 to the pipes 10 and 13. The oscillator circuit components are shown mounted on a mounting board 53 which may be of the printed circuit type. The board and components are encapsulated in an epoxy resin case 54 to protect against adverse effects of weather and other hazardous conditions. In the illustrated arrangement the terminals 17 and 18 each comprise separate metallic blocks, or yokes, which straddle the pipes and are clamped thereto by the screw finishing means 19. The terminals 17 and 18 are shown secured to the plastic case 54 by screw fastening means 56 and 57, respectively, which serve also as the electrical path between the terminals 17 and 18 and the electrical components encapsulated in the case 54. The oscillator comprises a permanent installation on the pipes for the detection of the cathodic protection system potential. As mentioned above, the insulated coupling 14 which is spanned by the oscillator is normally included in a pipeline installation subject to cathodic protection.

Where the oscillator installation shown in FIGURES 1 and 5 is not applicable, another oscillator mounting method which may be employed is shown in FIGURE 6 of the drawings, to which figure reference is now made. As seen in FIGURE 6, a portion of the pipe 10 is insulated as by wrapping insulating tape 61 therearound. The terminal 17 is clamped to the pipe 10 in electrical contact therewith, while the terminal 18 is clamped over the insulating member 61 in electrical isolation from the pipe 10. A ground rod 62 is connected to the terminal 18 through a cable 63 secured to the terminal 18 by screw fastening means 64. When the pipe 10 is subject to a cathodic potential, the potential will appear across the terminals 17 and 18 when the ground rod 62 is driven into the ground a spaced distance from the pipeline. In most cases a cable length of 4–6 feet is sufficient. The oscillator will function in the same manner as described above, and when a suitable receiver is held adjacent thereto, the oscillations may be detected.

Reference is now made to FIGURE 7 of the drawings wherein there is shown a modified form of oscillator, designated 16', which is particularly adapted for use where the oscillator output is employed to provide an indication of the operation of the cathodic protection system at a remote location. As seen in FIGURE 7, the oscillator may be of the same design as the oscillator shown in detail in FIGURE 2 with the addition of a secondary winding 66 adjacent the inductor 27. Lead wires 67 and 68 from the winding 66 are brought out from the oscillator case and may be connected to a remotely located indicating recorder 69, or like device. Connection to the recorder 69 is shown being made through a telemetering transmitter 71 near the oscillator 16' and wires 72 and 73 between the transmitter and recorder. Obviously, radio circuits may be employed instead of wires 72 and 73, if desired, in accordance with the usual telemetering practice. Such remote location indication is made possible by the availability of a suitable power supply source. In FIGURE 7, an external source of supply 74 is shown providing power to the transmitter 71.

The oscillators 16 and 16' described above are particularly adapted for use on existing pipeline installations, although they may obviously be employed on new installations. A modified form of oscillator which is particularly adapted for use on new installations is shown in FIGURE 8 to which reference is now made. There, a pipe coupling 14' is shown comprising a generally cylindrical-shaped body 76 of insulating material having a flow passage therethrough. An oscillator circuit which may be of the same type as the oscillator shown in FIGURE 2 is integrally formed with the coupling 14', the oscillator components 26, 27, 28, etc. being shown encapsulated within the coupling 14'. Annular internally threaded metallic inserts 17' and 18' are provided at opposite ends of the coupling within which the pipes 10 and 13 are adapted to fit, and electrical connection is made from the inserts to the oscillator components. It will be noted that the inserts 17' and 18' serve the same electrical function as the terminals 17 and 18 shown in FIGURES 1 and 5. As with the arrangement of FIGURE 1, if the cathodic potential is at a satisfactory level, the oscillator will be supplied with a sufficiently large potential for operation of the oscillator. Oscillations may be detected by any suitable means such as the receiver 21 shown in FIGURE 1. As above, failure of operation of the oscillator indicate improper cathodic protection system operation.

As mentioned above, in the present state of the art, it is necessary to send technically trained personnel to each location where there are cathodic protection stations or test points in a system. The man must connect, read and remove the equipment for each reading. Exact values in most cases are not of great value but only to determine presence of some protecting voltage.

An oscillator of this invention, once installed at one of these test points which are normally associated with a gas meter installation at a home or industrial location, would provide continuous oscillations as long as the "protection" voltage is present. This then could be observed by a meter reader on his normal monthly rounds, by holding his receiver detector close to the epoxy block and, upon activating his receiver, noting either the tone, or lack of it in his list of readings at this location. Thereafter in the normal course of handling the readings a note of no "tone" on the meter reader's card for a particular location could be referred to the cathodic protection department for speedy handling of a problem. There is thus a check of each point once a month instead of the much longer intervals common heretofore, resulting in a great saving in damage to pipelines and equipment not under cathodic protection. Of course, where the arrangement of FIGURE 7 is employed, the indicator and/or recorder 69 may be positioned at a location where substantially continuous monitoring of the system is possible.

Now having described the invention in detail in accordance with the requirements of the patent statutes, various other changes and modifications will suggest themselves to those skilled in this art. It is intended that such changes and modifications shall fall within the spirit and scope of the invention as recited in the following claims.

I claim:

1. A pipe coupling for connecting together a pair of pipes comprising, a generally cylindrical-shaped pipe coupling body of insulating material, a semiconductor oscillator integrally formed with the body and including a pair of bias supply terminals, and means connecting the terminals to the pair of pipes.

2. The invention as recited in claim 1 wherein the last-mentioned means includes metallic inserts at opposite ends of the coupling for connection to the pipes.

3. A monitoring apparatus for use with a system of pipelines, cables, or the like, buried in the earth and to which system a source of cathodic protection potential is applied for the cathodic protection of the system, said monitoring apparatus comprising:

an oscillator, and means for connecting the oscillator to a system to which a source of cathodic protection potential is applied for energization of the oscillator by the cathodic protection potential, said oscillator oscillating with bias potentials supplied solely by the cathodic protection potential, said oscillator being operable when the cathodic protection potential is above a predetermined value higher than a minimum desired potential and inoperative when the cathodic protection potential is below the predetermined value.

4. The combination comprising,
a system of pipelines, cables, or the like buried in the earth,
a source of cathodic protection potential applied to the system to protect the same against corrosion,
an oscillator, and
means for mechanically attaching and electrically connecting said oscillator to said system,
the oscillator being operable when the cathodic protection potential is above a predetermined value and inoperable at a potential therebelow, the source of cathodic protection potential applied to the system providing the sole supply potential for the oscillator.

5. The combination defined in claim 4 including means for detecting oscillations of the oscillator.

6. The combination defined in claim 5 wherein said detecting means comprises a portable receiver for detecting and amplifying a signal from the oscillator.

7. The combination defined in claim 4 wherein the system includes a pair of conducting members with an insulating coupling therebetween, and means integrally forming the oscillator with the coupling.

8. The combination defined in claim 4 wherein the system includes a pair of conducting members with an insulating coupling therebetween, said oscillator being connected to said conducting members across said coupling by said means for mechanically attaching and electrically connecting said oscillator to said system.

9. The combination defined in claim 4 wherein the means for mechanically attaching and electrically connecting said oscillator to said system includes a pair of supply terminals, means for connecting one supply terminal to the system subject to the cathodic potential, and means including a ground rod for connecting the other terminal to earth.

10. An oscillator for use in a pipeline system to which a source of cathodic protection potential is applied for the cathodic protection of the system, said oscillator comprising,
a body having a flow passage therethrough,
an oscillator circuit integrally formed with the body and including a pair of bias supply terminals, and
means for mechanically connecting the flow passage and electrically connecting the bias supply terminals to a pair of pipes in a pipeline system to which system a source of cathodic protection potential is applied for flow through the flow passage and supply of bias potential to the oscillator circuit.

11. The oscillator as recited in claim 10 wherein said body is made of insulating material, and
said last-mentioned means includes metallic inserts in said body at opposite ends of the flow passage for connection to the pipes.

12. The combination comprising,
a coupling for connecting together a pair of conducting members, one of which is connected to a source of cathodic protection potential, said coupling having a body of insulating material,
a semiconductor oscillator integrally formed with the body and including a pair of bias supply terminals,
and means for electrically connecting said terminals to a pair of conducting members.

13. The combination as recited in claim 12 wherein the last-mentioned means comprise metallic members on the body into which the ends of a pair of conducting members are adapted to fit for mechanically interconnecting the conducting members.

References Cited by the Examiner

UNITED STATES PATENTS

| | | | |
|---|---|---|---|
| 1,807,903 | 6/1931 | Finley | 307—95 |
| 2,491,445 | 12/1949 | Cunningham et al. | 324—71 XR |
| 2,707,760 | 5/1955 | Sherman | 331—65 X |
| 2,993,167 | 7/1961 | Smith | 324—72.5 X |
| 3,026,505 | 3/1962 | Bevilacqua | 331—64 X |
| 3,038,154 | 6/1962 | Zworykin et al. | 325—16 X |
| 3,041,499 | 6/1962 | Williams et al. | 340—366 X |
| 3,054,095 | 9/1962 | Heller | 340—210 X |
| 3,063,004 | 11/1962 | Vic | 331—64 X |
| 3,175,047 | 3/1965 | Borberg | 340—252 X |
| 3,196,357 | 7/1965 | Hoag | 324—29.5 X |

FOREIGN PATENTS 438,262 11/1935 Great Britain.

NEIL C. READ, *Primary Examiner.*

D. K. MYER, *Assistant Examiner.*